(12) United States Patent
Bunker

(10) Patent No.: US 10,598,026 B2
(45) Date of Patent: Mar. 24, 2020

(54) ENGINE COMPONENT WALL WITH A COOLING CIRCUIT

(71) Applicant: General Electric Company, Schenectady, NY (US)

(72) Inventor: Ronald Scott Bunker, West Chester, OH (US)

(73) Assignee: General Electric Company, Schenectady, NY (US)

( * ) Notice: Subject to any disclaimer, the term of this patent is extended or adjusted under 35 U.S.C. 154(b) by 559 days.

(21) Appl. No.: 15/152,850

(22) Filed: May 12, 2016

(65) Prior Publication Data
US 2017/0328212 A1   Nov. 16, 2017

(51) Int. Cl.
*F01D 5/18* (2006.01)
*F01D 5/14* (2006.01)

(52) U.S. Cl.
CPC ............. *F01D 5/186* (2013.01); *F01D 5/147* (2013.01); *F01D 5/183* (2013.01); *F05D 2260/202* (2013.01); *Y02T 50/672* (2013.01); *Y02T 50/676* (2013.01)

(58) Field of Classification Search
CPC .......... F01D 5/147; F01D 5/183; F01D 5/186; F01D 5/182; F01D 5/184; F05D 2260/202
See application file for complete search history.

(56) References Cited

U.S. PATENT DOCUMENTS

| | | | |
|---|---|---|---|
| 3,620,643 A | * | 11/1971 | Jones ................ F01D 5/184 416/229 A |
| 3,644,060 A | * | 2/1972 | Bryan ................ F01D 5/184 416/226 |
| 3,698,834 A | * | 10/1972 | Meginnis ............... F01D 5/184 416/231 R |
| 4,042,162 A | * | 8/1977 | Meginnis ............... B23K 20/00 228/106 |
| 5,363,645 A | | 11/1994 | Pellet |
| 6,375,425 B1 | | 4/2002 | Lee et al. |
| 6,443,700 B1 | | 9/2002 | Grylls et al. |
| 6,461,107 B1 | | 10/2002 | Lee et al. |
| 6,499,949 B2 | | 12/2002 | Schafrik et al. |
| 6,511,762 B1 | | 1/2003 | Lee et al. |
| 6,551,061 B2 | | 4/2003 | Darolia et al. |
| 6,617,003 B1 | | 9/2003 | Lee et al. |
| 6,749,396 B2 | | 6/2004 | Barry et al. |
| 6,905,302 B2 | | 6/2005 | Lee et al. |
| 7,186,091 B2 | | 5/2007 | Lee et al. |
| 7,513,744 B2 | | 4/2009 | Cunha et al. |

(Continued)

FOREIGN PATENT DOCUMENTS

EP   1 475 567 A1   11/2004

OTHER PUBLICATIONS

International Search Report and Written Opinion issued in connection with corresponding PCT Application No. PCT/US2017/025708 dated Jan. 23, 2018.

*Primary Examiner* — Moshe Wilensky
*Assistant Examiner* — Jesse M Prager
(74) *Attorney, Agent, or Firm* — McGarry Bair PC

(57) ABSTRACT

An apparatus and method for cooling an engine component includes a wall. The wall can include multiple layers. The layers can be different materials and define an interior for the engine component. The layers can include shaped features to define a serial cooling air flow path for providing a flow from the interior to an exterior of the engine.

12 Claims, 8 Drawing Sheets

(56) References Cited

U.S. PATENT DOCUMENTS

| | | | |
|---|---|---|---|
| 9,003,657 B2 | 4/2015 | Bunker et al. | |
| 2001/0042607 A1* | 11/2001 | Roesler | B22C 7/02 |
| | | | 164/34 |
| 2007/0280832 A1* | 12/2007 | Liang | F01D 5/186 |
| | | | 416/97 R |
| 2011/0259017 A1* | 10/2011 | Lacy | F01D 5/186 |
| | | | 60/806 |
| 2012/0114912 A1 | 5/2012 | Bunker et al. | |
| 2013/0094971 A1* | 4/2013 | Lacy | F01D 5/183 |
| | | | 416/97 R |
| 2014/0112758 A1* | 4/2014 | Arikawa | C23C 24/04 |
| | | | 415/115 |
| 2014/0169943 A1* | 6/2014 | Bunker | C23C 4/02 |
| | | | 415/116 |
| 2014/0302278 A1* | 10/2014 | Bunker | B05D 3/002 |
| | | | 428/137 |
| 2015/0064019 A1 | 3/2015 | Lacy et al. | |
| 2015/0321289 A1 | 11/2015 | Bruck et al. | |
| 2015/0322800 A1 | 11/2015 | Crosatti et al. | |

\* cited by examiner

ENGINE COMPONENT WALL WITH A COOLING CIRCUIT

BACKGROUND OF THE INVENTION

Turbine engines, and particularly gas or combustion turbine engines, are rotary engines that extract energy from a flow of combusted gases passing through the engine onto a multitude of rotating turbine blades.

Gas turbine engines for aircraft, for example, are designed to operate at high temperatures to maximize engine efficiency, so cooling of certain engine components, such as the high pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine airfoils generally include one or more interior cooling passages for routing the cooling air through the airfoil to cool different portions, such as the walls of the airfoil. Often, film holes are used to provide the cooling air from the interior cooling passages to form a surface cooling film to separate the hot air from the airfoil. However, the film holes provide the surface cooling film to a discrete, local portion of the airfoil and require a large flow to maintain proper surface cooling over an area of the airfoil exterior surface.

BRIEF DESCRIPTION OF THE INVENTION

In one aspect, embodiments of the invention relate to an airfoil for a turbine engine including an outer wall having an outer surface and an inner surface bounding an interior space. The outer wall defines a pressure side and a suction side extending axially between a leading edge and a trailing edge and extending radially between a root and a tip. The airfoil further comprises at least one porous layer provided on the outer surface, a skin layer provided on an exterior of the porous layer, at least one cooling air supply circuit located within the interior; and at least one skin cooling circuit comprising at least one channel formed in the skin layer. The supply circuit is fluidly coupled to the porous layer, which is fluidly coupled to the at least one channel to define a serial cooling air flow path via the supply circuit, porous layer, and skin cooling circuit.

In another aspect, embodiments of the invention relate to an engine component for a turbine engine, which generates a hot fluid flow, and provides a cooling fluid flow. The engine component includes a wall separating the hot fluid flow from the cooling fluid flow and having a first surface along with the hot fluid flow in a hot flow path and a second surface facing the cooling fluid flow. The engine component further includes at least one porous layer provided on the first surface, a skin layer provided on an exterior of the porous layer, and at least one skin cooling circuit comprising at least one channel formed in the skin layer. The cooling fluid flow is fluidly coupled from the interior to the skin layer through the porous layer.

In yet another aspect, embodiments of the invention relate to a method of cooling an airfoil including passing a cooling airflow through an interior of a porous layer on an outer wall of an airfoil, then to a channel in a skin layer overlying the porous layer, and then to a hole in a coating overlying the outer surface.

DESCRIPTION OF EMBODIMENTS OF THE INVENTION

Figure 1:
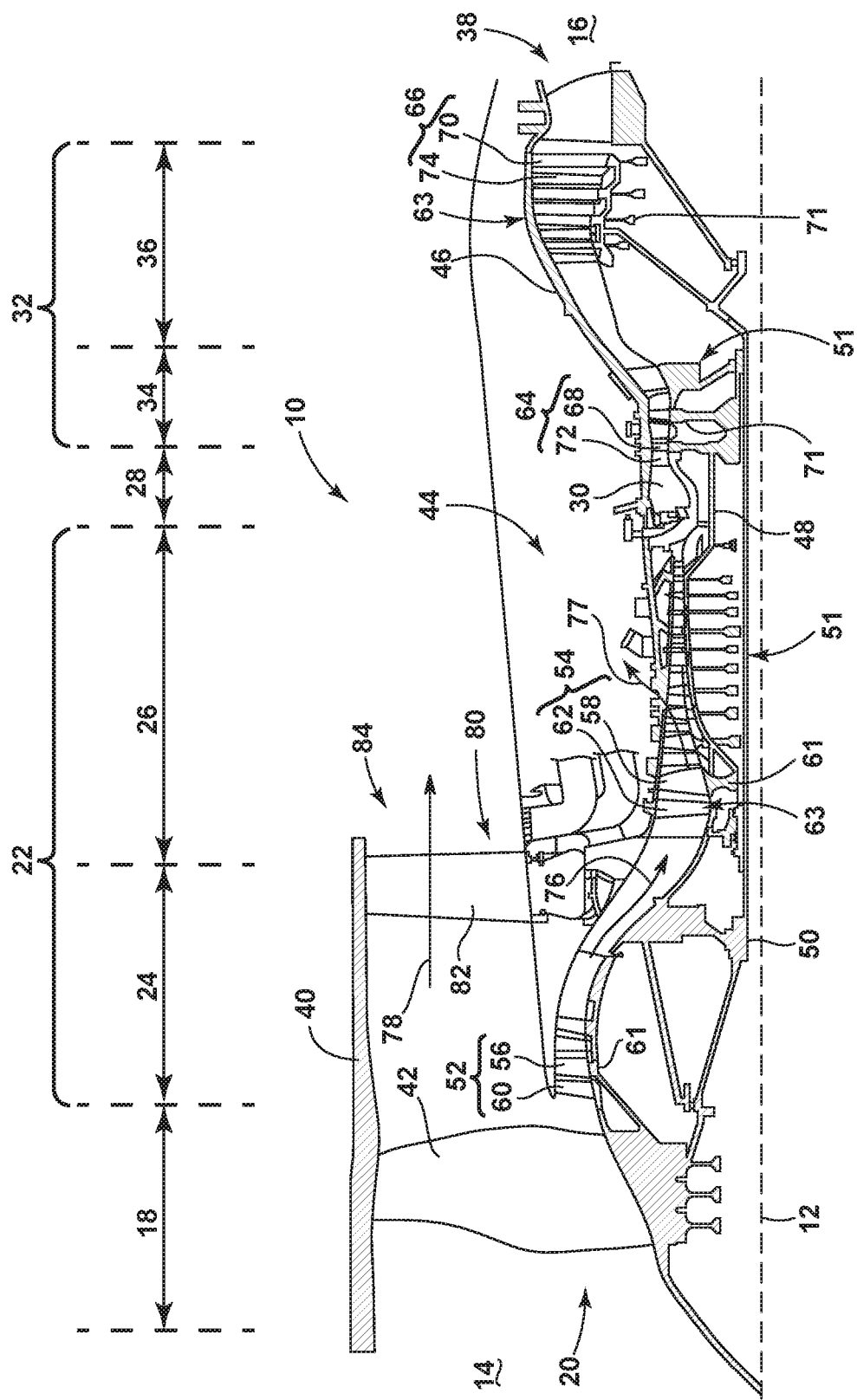
FIG. 1 is a schematic cross-sectional diagram of a turbine engine for an aircraft.

The described embodiments of the present invention are directed to a wall of an engine component for providing a flow of cooling fluid to a hot surface. For purposes of illustration, the present invention will be described with respect to an airfoil for the turbine of an aircraft gas turbine engine. It will be understood, however, that the invention is not so limited and may have general applicability within an engine, including compressors, as well as in non-aircraft applications, such as other mobile applications and non-mobile industrial, commercial, and residential applications. Additional engine components that require cooling fluid, such as a vane, shroud, or combustor liner, in non-limiting examples, are contemplated and the wall as described herein should not be limited to the airfoil used to describe such an implementation.

As used herein, the term "forward" or "upstream" refers to moving in a direction toward the engine inlet, or a component being relatively closer to the engine inlet as compared to another component. The term "aft" or "downstream" used in conjunction with "forward" or "upstream"

refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be draw from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
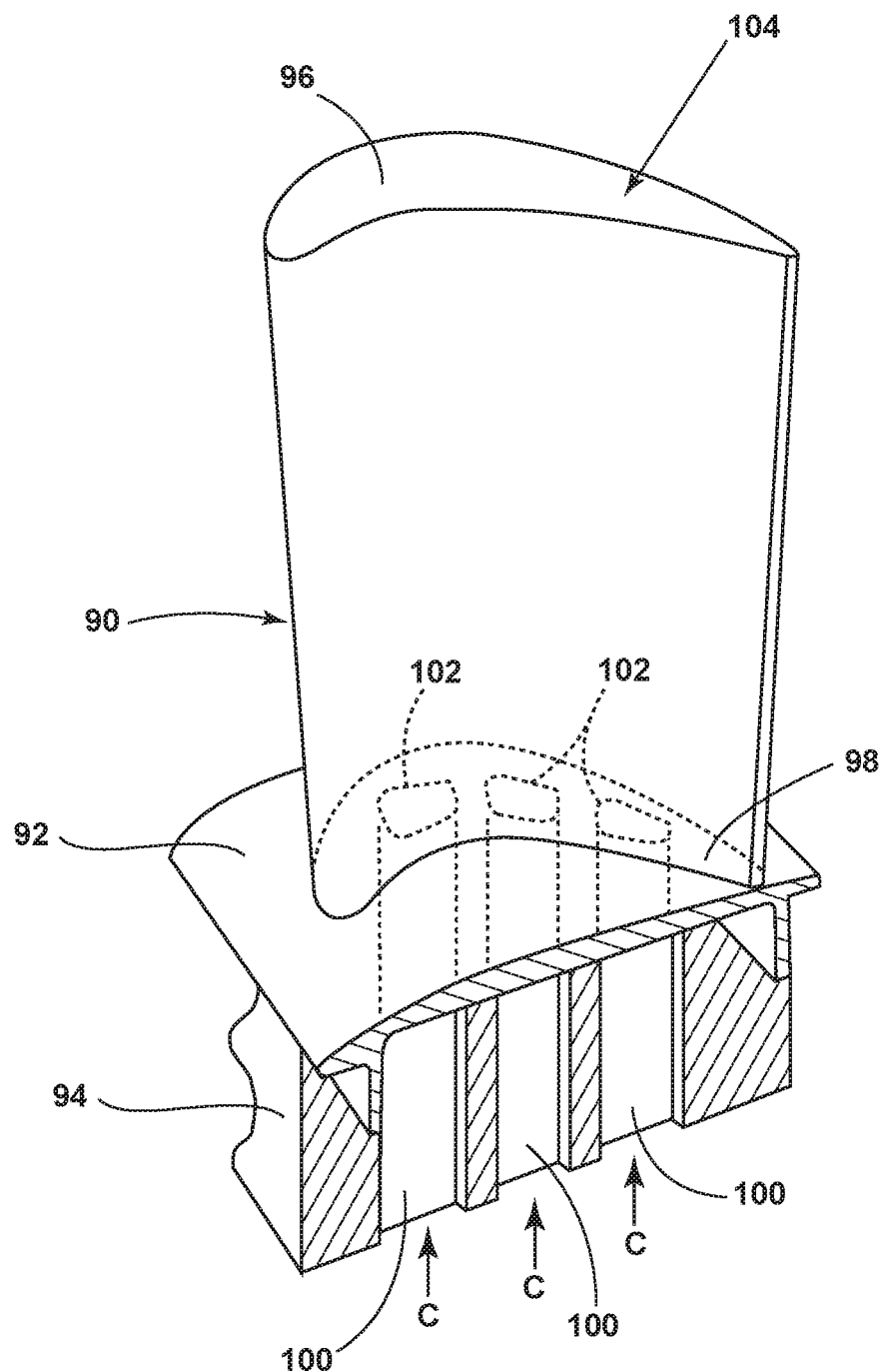
FIG. 2 is a perspective view of an engine component in the form of an airfoil as a blade of the turbine engine of FIG. 1.

FIG. 2 is a perspective view of an engine component in the form of an airfoil 90, a platform 92, and a dovetail 94, which can mount to the disk 71 of the engine 10 of FIG. 1 as a rotating blade, or alternatively, can be a stationary vane. The airfoil 90 includes a tip 96 and a root 98, defining a span-wise direction therebetween. The airfoil 90 mounts to the platform 92 at the root 98. The platform 92 as shown is only a section, and can be an annular band for mounting a plurality of airfoils 90. The airfoil 90 can fasten to the platform 92, such as welding or mechanical fastening, or can be integral with the platform 92. The dovetail 94 couples to the platform 92 opposite of the airfoil 90, and can be configured to mount to the disk 71, or rotor 51 of the engine 10. The dovetail 94 can include one or more inlet passages 100, having an outlet 102 disposed at the root 98. It should be appreciated that the dovetail 94 is shown in cross-section, such that the inlet passages 100 are housed within the body of the dovetail 94. The inlet passages 100 can provide a cooling fluid flow C to an interior 104 of the airfoil 90 for cooling of the airfoil 90 in one non-limiting example. It should be understood that while the description herein is related to an airfoil, it can have equal applicability in other engine components requiring cooling such as film cooling. Such engine components can include but are not limited to, a shroud, a blade, a vane, or a combustion liner.

Figure 3:
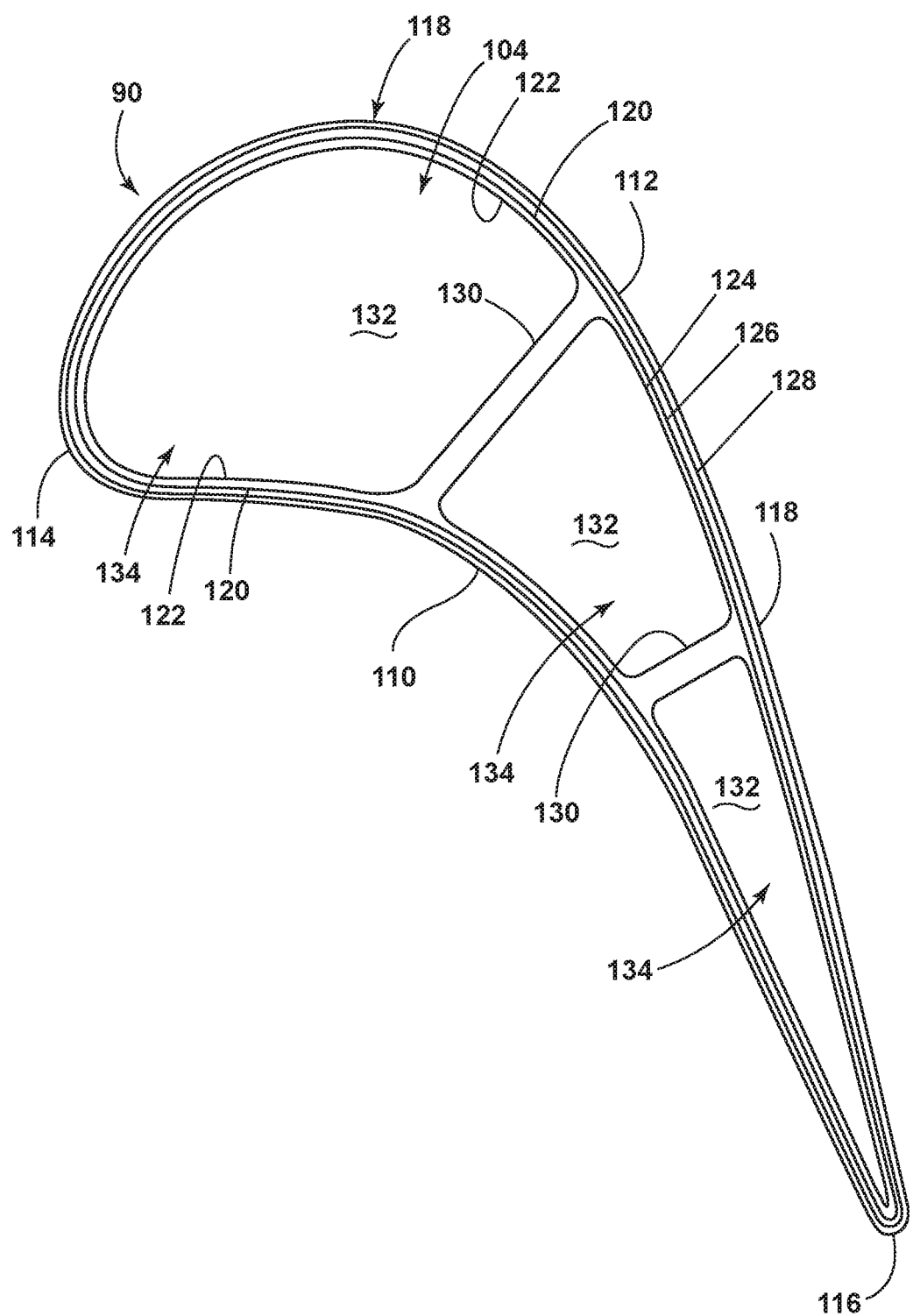
FIG. 3 is a cross-sectional view of the airfoil of FIG. 2 including a three layer wall.

Referring to FIG. 3, the airfoil 90, shown in cross-section, has a concave-shaped pressure sidewall 110 and a convex-shaped suction sidewall 112 with a leading edge 114 and a trailing edge 116 defining a chord-wise direction therebetween. The pressure and suction sidewalls 110, 112 define an outer wall 118 bounding the interior 104. The airfoil 90 as an exemplary blade, rotates in a direction such that the pressure sidewall 110 follows the suction sidewall 112. Thus, as shown in FIG. 3, the airfoil 90 would rotate upward toward the top of the page. As a stationary vane, the airfoil 90 would not rotate.

The outer wall 118 includes an outer surface 120 and an inner surface 122. The inner surface 122 bounds the interior 104. The outer wall 118 has a multiple-layer configuration, which can be any number of layers as needed, and is illustrated as a three-layer wall, including an inner layer 124, a porous layer 126, and a skin layer 128. The porous layer 126 is provided on the exterior of the outer surface 120 and the skin layer 128 can be provided on the exterior of the porous layer 126. Each layer 124, 126, 128 can be manufactured using method of formation individual to or similar to one another. In a first example, the layers 124, 126, 128 can be made from additive manufacturing methods.

In other non-limiting examples, the inner layer 124 can be cast, the porous layer 126 can be machined and placed on top of the inner layer 124, and the skin layer 128 can be applied by additive manufacturing. In another example, the entire outer wall 118 could be cast. In yet another example, the outer wall 118 could be made using additive manufacturing. It should be appreciated that any of the layers 124, 126, 128 can be made by any known method including but not limited to, casting, machining, additive manufacturing, coating, or otherwise.

The inner layer 124 and skin layer 128 can be made of similar materials, such as high strength superalloy metals, typically used for durability while minimizing the need for cooling. Such materials can include, but are not limited to nickel, cobalt, or iron based superalloys, ceramic matrix composites, steel, or refractory metals such as titanium. The porous layer 126 can be a porous material, defining a porosity, being permeable by a volume of fluid, such as air. The porous layer 126 can have a particular porosity to meter the flow of a fluid passing through the porous layer 126 at a predetermined rate. It should be appreciated that additive manufacturing can be used to achieve a particular local porosity along the porous layer 126. In alternative examples, the porous layer 126 can be made of any of the materials described above, such that a porosity is defined. In one non-limiting example, the porous layer 126 can be an open cell porous metallic layer made of Ni, NiCrAlY, NiAl, or similar materials. The open cell porous metallic layer can further be made of a nickel foam, for example.

Ribs 130 can be included in the interior 104 of the airfoil 90. The ribs 130 can extend between the pressure sidewall 110 and the suction sidewall 112, coupling to or being integral with the inner layer 124. One or more interior passages 132 are defined by the ribs 130 and the outer wall 118, extending in the span-wise direction, while it should be understood that other interior cooling delivery geometries are contemplated, especially in other engine components. A cooling air supply circuit 134 can be defined within the interior 104. The cooling air supply circuit 134 can provide a flow of cooling fluid to the interior 104 for cooling the airfoil 90 or for providing a volume of fluid for exhausting from the airfoil 90 as a cooling film. The cooling air supply circuit 134 can be fed with the flow of cooling fluid C provided to the passages 132 from the dovetail 94 (FIG. 2).

Figure 4:
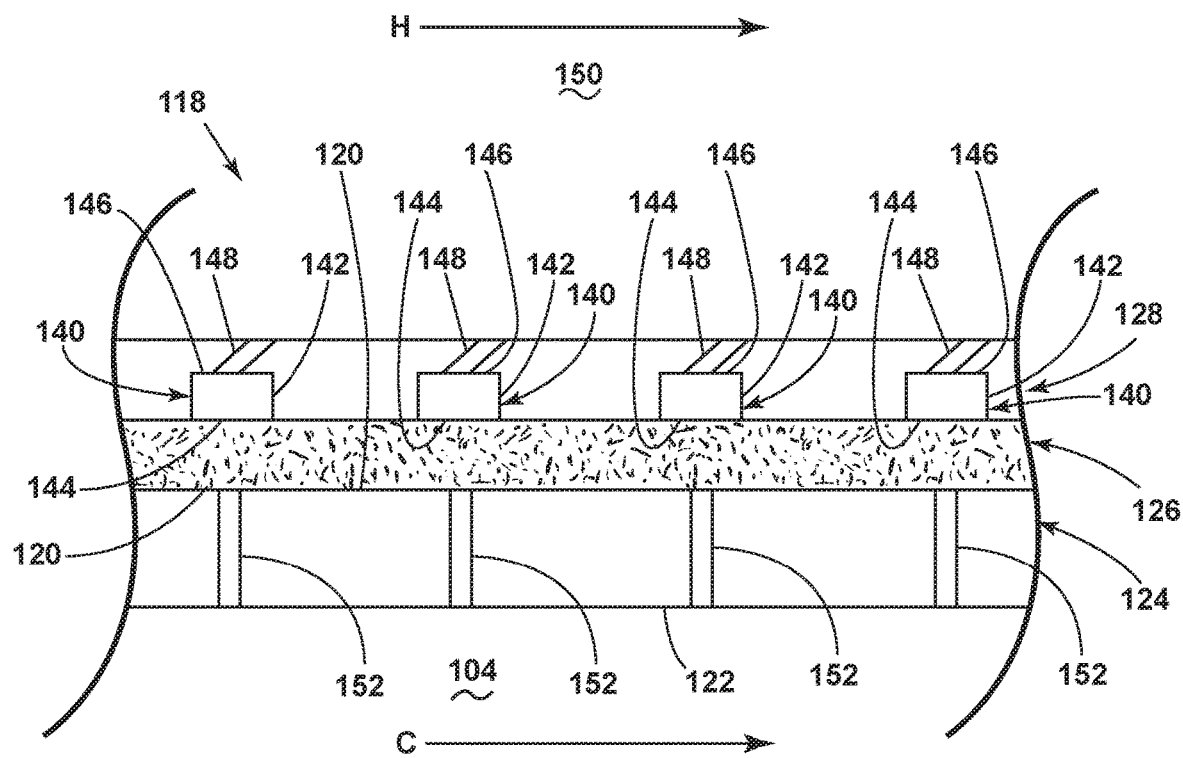
FIG. 4 is a cross-sectional view of a wall of the airfoil of FIG. 2, having a skin layer overlying a porous layer, according to an embodiment of the invention.

Referring to FIG. 4, an enlarged cross-sectional view of the outer wall 118 separating a cooling fluid flow C from a hot gas flow H, illustrates the three layers 124, 126, 128. A skin cooling circuit 140 can be disposed in the skin layer 128. The skin cooling circuit 140 can include at least one channel 142 formed in the skin layer 128. The channels 142 can include an open end 144 and a closed end 146. The open end 144 is adjacent to the porous layer 126 and the closed end 146 is terminates in the skin layer 128. The channels 142 are in fluid communication with the porous layer 126. A plurality of film holes 148 can extend from the channels 142 to an exterior 150 of the airfoil 90. At least one supply hole 152 can be disposed in the inner layer 124. The supply hole 152 can fluidly couple the interior 104 to the porous layer 126. The supply hole 152 further couples the cooling air supply circuit 134 (FIG. 3) to the porous layer 126.

Figure 5:
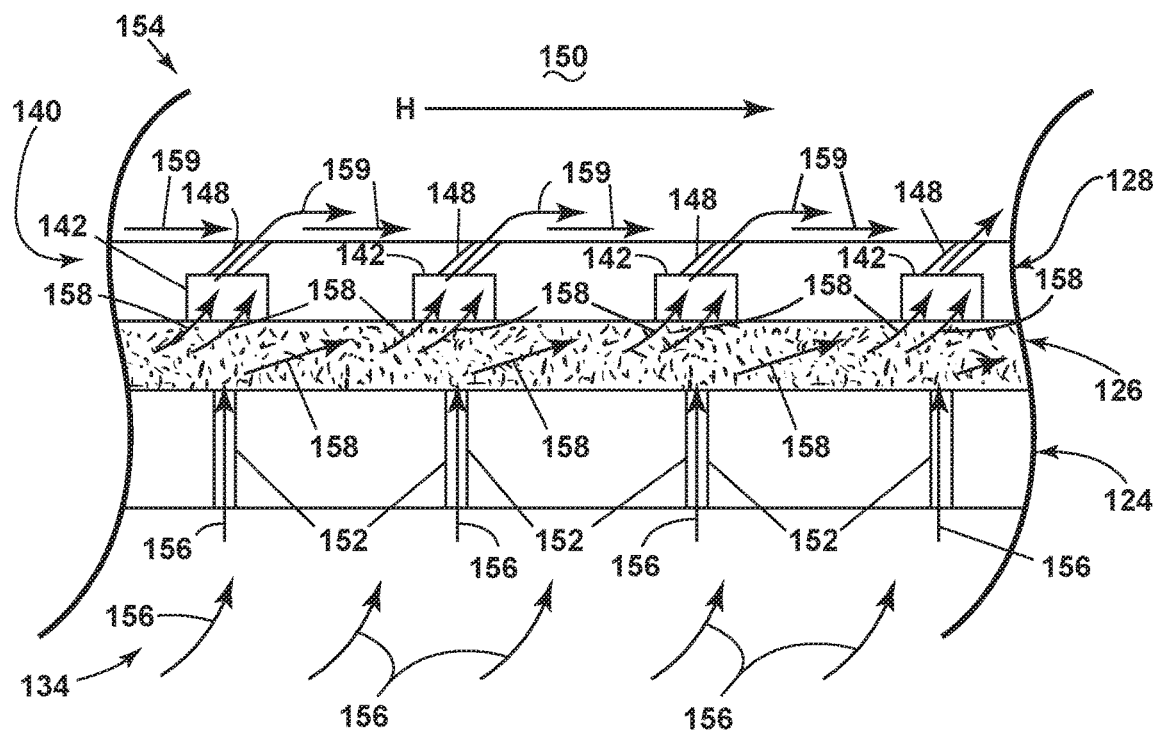
FIG. 5 illustrates the cross-sectional view of FIG. 4, including the airflow moving through the wall, according to an embodiment of the invention.

Referring now to FIG. 5, the cooling air supply circuit 134 fluidly couples to the porous layer 126 and the porous layer 126 fluidly couples to the at least one channel 142 to define a serial cooling air flow path 154 via the cooling air supply circuit 134, porous layer 126, and the skin cooling circuit 140.

In operation, a supply flow 156 is provided from the air supply circuit 134. The supply flow 156 is provided to the supply holes 152 where it passes into the porous layer 126. A porous flow 158, fed by the supply flow 156, can pass within the porous layer 126. The porous flow 158 can exhaust to the channels 142 of the skin cooling circuit 140. A cooling film 159 is exhausted from the channels 142 through the film holes 148 to provide the cooling film 159 along the skin layer 128.

Figure 6:
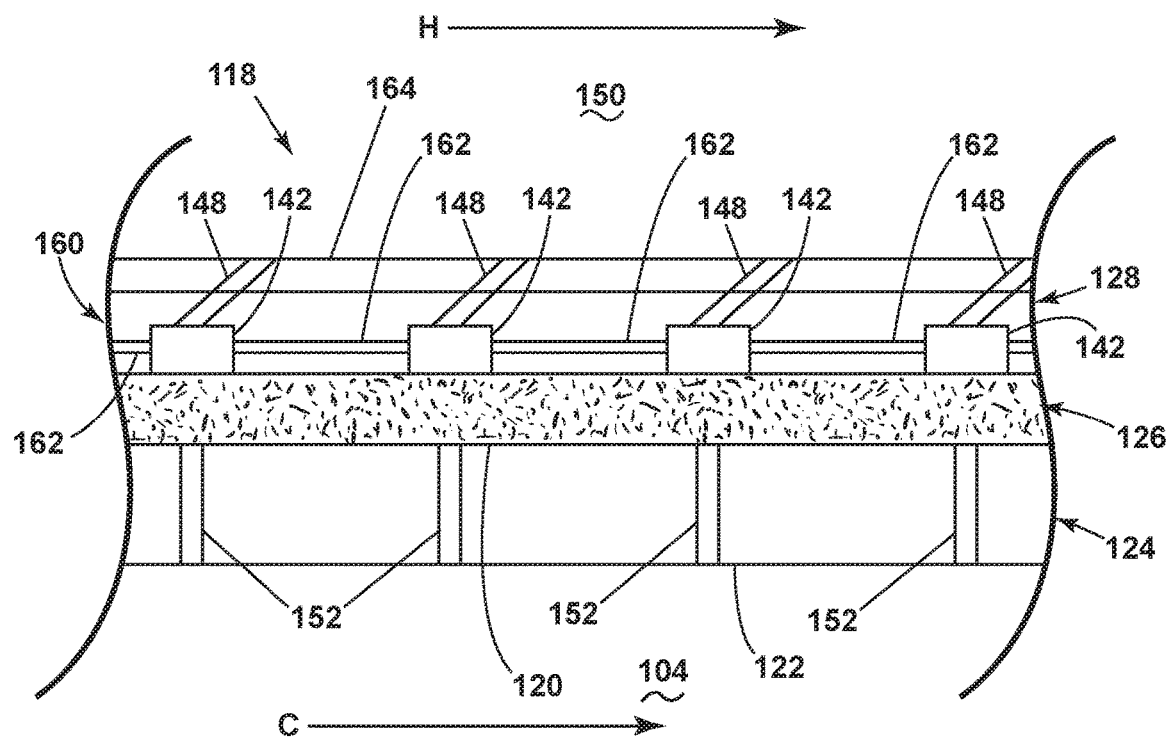
FIG. 6 is a cross-sectional view of the wall of the airfoil of FIG. 2, having the skin layer including interconnected channels, overlying the porous layer, according to an embodiment of the invention.

Referring now to FIG. 6, an alternate skin cooling circuit 160 is illustrated, having intermediate conduits 162 coupling adjacent channels 142. A flow of fluid can pass between the adjacent channels 142 via the intermediate conduits 162. Such a flow can maintain pressures along the skin cooling circuit 160 or can meter a cooling film downstream of the porous layer 126 among a system of channels 142. Additionally, a coating 164 can be placed on the exterior surface of the skin layer 128. The film holes 148 can extend from the skin layer 128 through the coating 164 for providing a film of cooling fluid along the exterior surface of the coating 164. The coating 164, in a non-limiting examples, can be a thermal barrier coating.

Figure 7:
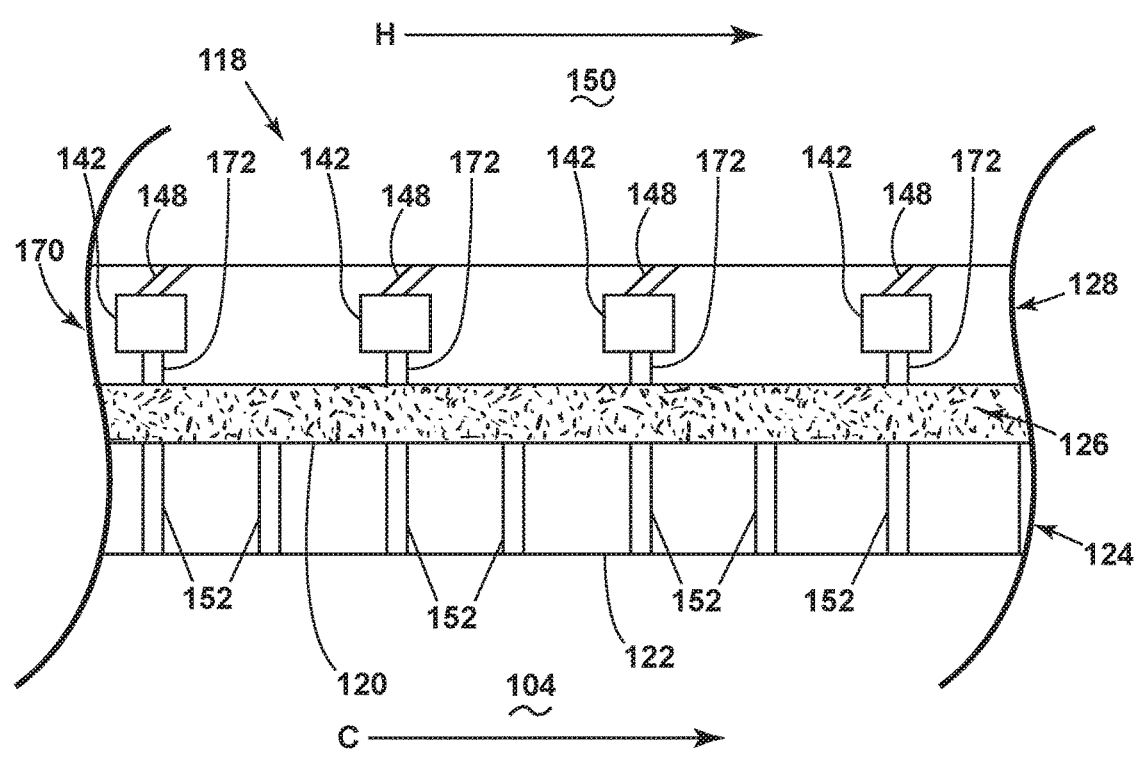
FIG. 7 is a cross-sectional view of the wall of the airfoil of FIG. 2, having the channels spaced from the porous layer, according to an embodiment of the invention.

Referring now to FIG. 7, illustrating another alternate skin cooling circuit 170, the channels 142 can be spaced from the porous layer 126. At least one channel conduit 172 can be disposed between the porous layer 126 and the channels 142. The channel conduits 172 fluidly couple the porous layer 126 to the channels 142 to provide a flow of fluid to the skin cooling circuit 170. The channel conduits 172 can meter the flow provided to the skin cooling circuit 170 from the porous layer 126. Additionally, the number of supply holes 152 can be increased, providing a higher flow rate to the porous layer 126. Similarly, the number of supply holes 152, channels 142, or the porosity of the porous layer 126 can be adapted to control or meter the flow rates provided to the serial cooling air flow path 154.

Regarding FIGS. 4-7, it should be appreciated that the film holes 148 can originate from any side of the channels 142, such as any closed end as shown, the sides, or any open end as described. Furthermore, there should be no limitation on the orientation, number, size, or shape of such holes. Similarly, the supply holes 152 also should not be limited, allowing the same range of geometry, only limited that the must originate on the inner surface 122. The geometry of the channels 142 is also exemplary, and should not be limited as shown. Furthermore, the interface of the channels 142 with the porous layer 126 need not be of full extent as shown. For example, the junction between the channels 142 and the porous layer can be based upon a shape of the channels 142, such as a polygon or oval shape having only a bottom section fluidly coupled to the porous layer 126.

Furthermore, it should be appreciated that the elements as shown in FIGS. 4-7 are not limited to the 2-dimensional sections as illustrated. The elements, such as the channels 142, film holes 148, or supply holes 152 can extending in three-dimensional space, such as in a span-wise direction, an axial direction, a radial direction, or any combination or permutation thereof.

Figure 8:
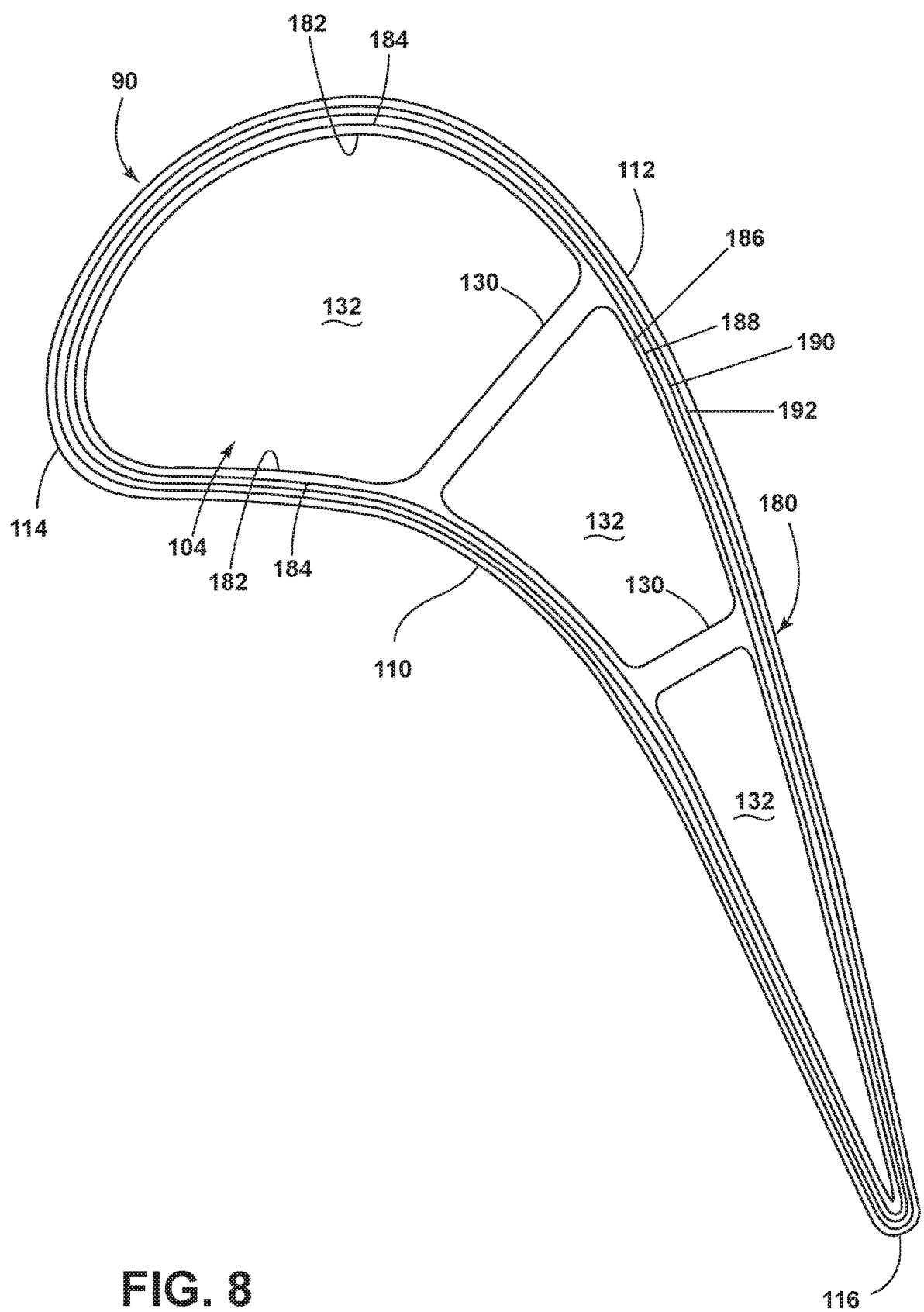
FIG. 8 is a cross-sectional view of the airfoil of FIG. 2 including a four layer wall.

Referring now to FIG. 8 an alternative airfoil 90 is illustrated including a four-layer outer wall 180. The outer wall 180 includes an inner surface 182 and an outer surface 184, having inner layer 186, a first porous layer 188, a skin layer 190, and a second porous layer 192. The first porous layer 188 is provided on the outer surface 184. The skin layer 190 is provided on the exterior of the first porous layer 188 and the second porous layer 192 is provided on the exterior of the skin layer 190.

Figure 9:
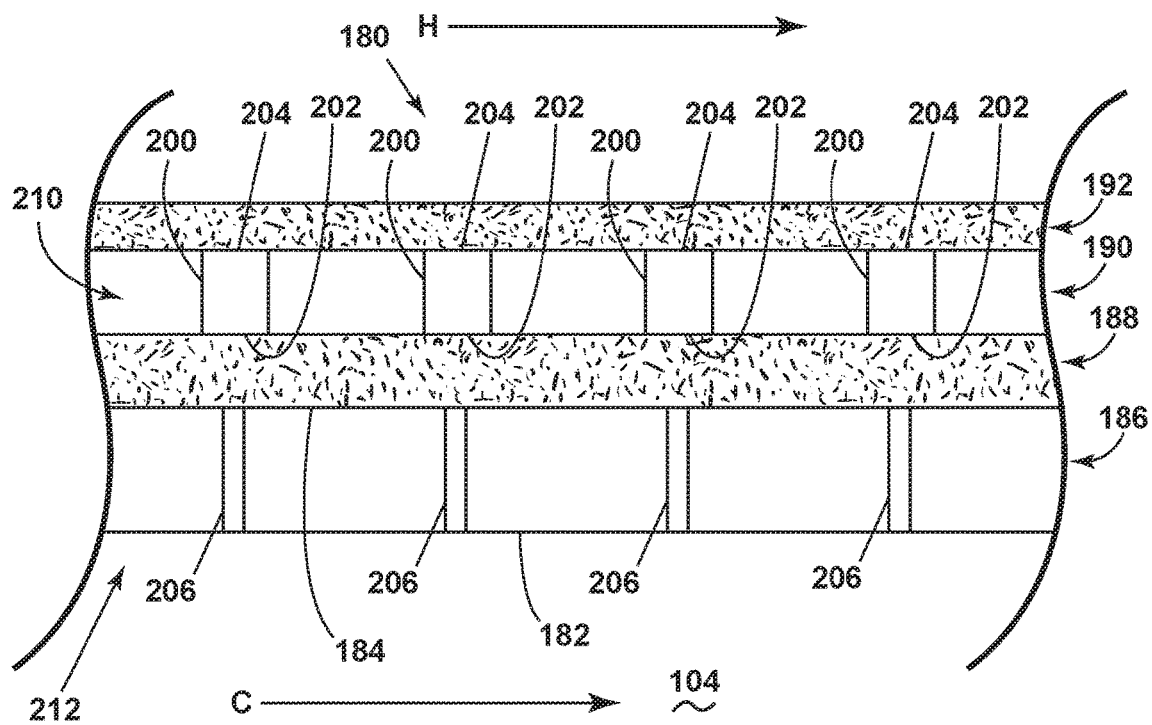
FIG. 9 is a cross-sectional view of the wall of FIG. 7 including two porous layers having channels disposed in a skin layer adjacent to the porous layers, according to an embodiment of the invention.

Referring now to FIG. 9, at least one channel 200 is disposed in the skin layer 190. The channel includes a first open end 202 and a second open end 204. The first open end 202 confronts the first porous layer 188 and the second open end 204 confronts the second porous layer 192. A plurality of supply holes 206 are disposed in the inner layer 186. The supply holes 206 couple the interior 104 to the skin layer 190.

A skin cooling circuit 210 is formed by the skin layer 190 having the plurality of channels 200. A cooling air supply circuit 212 is formed by the interior 104 and fluidly couples to the skin cooling circuit 210 via the supply holes 206 and the first porous layer 188.

Figure 10:
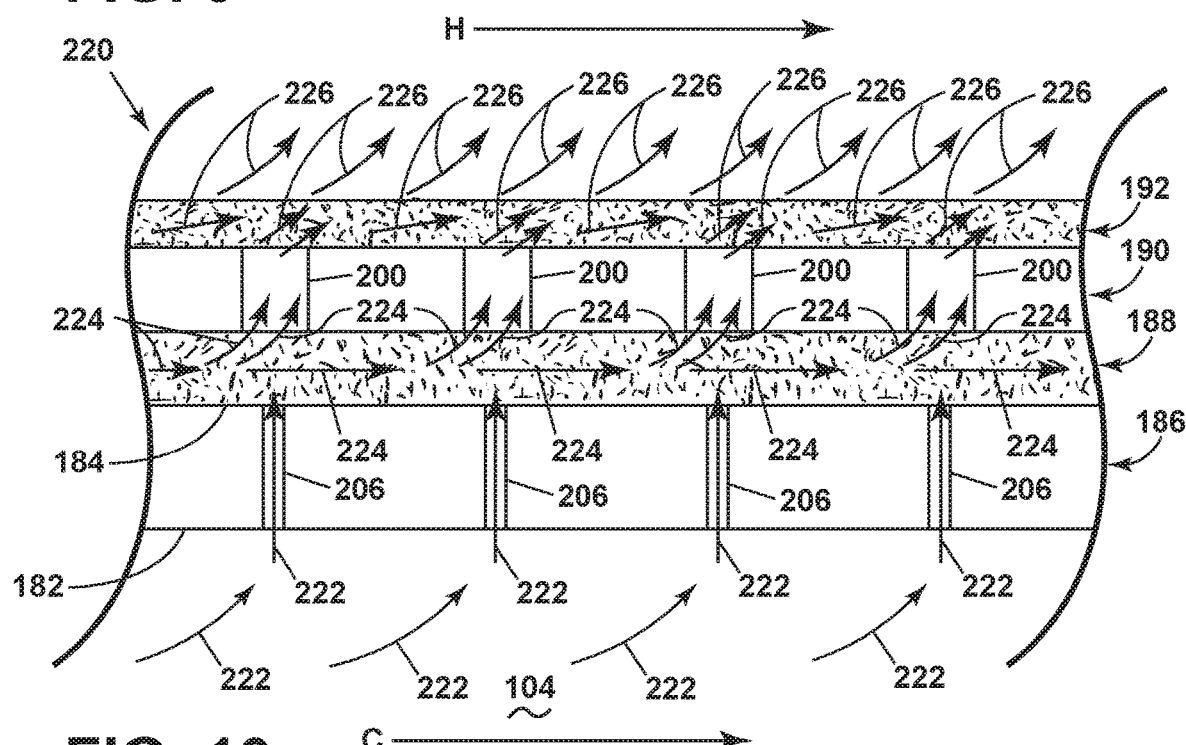
FIG. 10 is the cross-sectional view of FIG. 9, including the airflow moving through the wall.

Referring now to FIG. 10, a serial cooling air flow path 220 is formed by the combination of the skin cooling circuit 210, the cooling air supply circuit 212, and the first and second porous layers 188, 192. A supply flow 222 is provided to the supply holes 206. From the supply holes 206 the supply flow 222 is provided to the first porous layer 188 as a first porous flow 224. The first porous flow 224 can pass into the channels 200 at the first open end 202. The first porous flow 224 is exhausted from the channels 200 into the second porous layer 192 as a second porous flow 226. The second porous flow 226 can exit the second porous layer 192 as a cooling film 226 provided on the exterior of the second porous layer 192.

Figure 11:
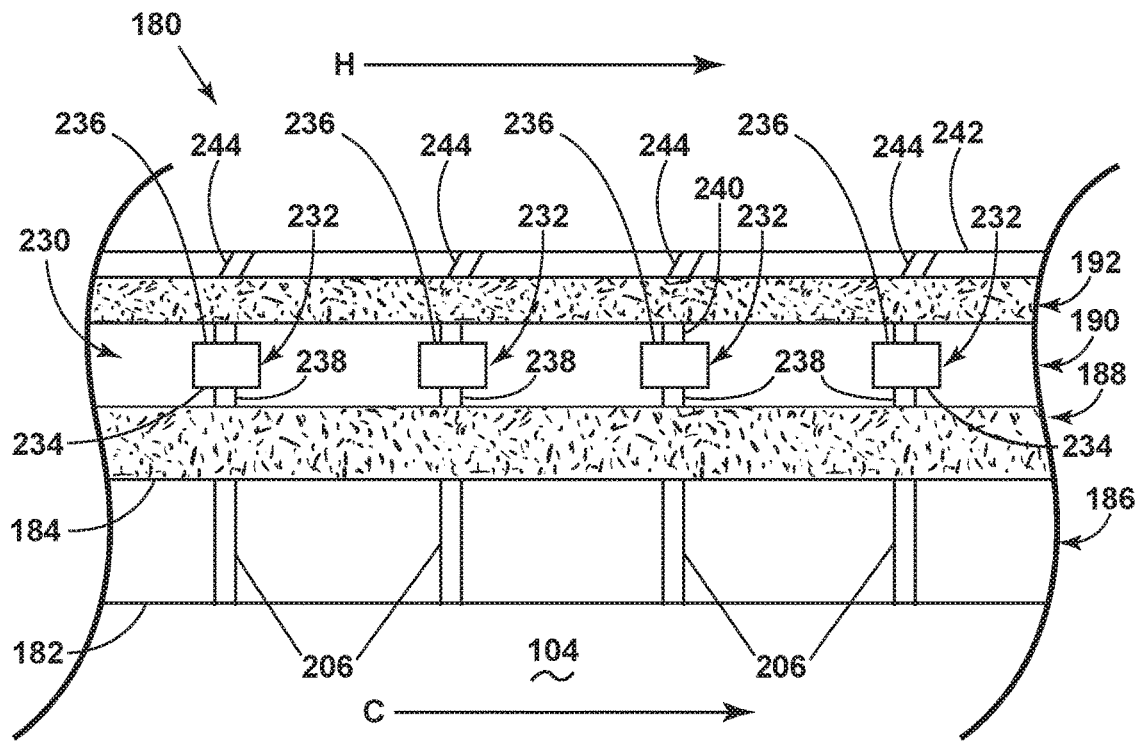
FIG. 11 is a cross-sectional view of the wall of FIG. 7 including two porous layers having channels spaced from the porous layers, according to an embodiment of the invention.

FIG. 11 illustrates another exemplary skin cooling circuit 230. At least one channel 232 includes a first closed end 234 and a second closed end 236. A first set of channel conduits 238 intersects the first closed ends 234 of the channels and a second set of channel conduits 240 intersects the second closed ends 236. The first and second sets of channel conduits 238, 240 fluidly couple the first porous layer 188 to the second porous layer 192 through the skin cooling circuit.

A coating layer 242 is disposed on the exterior of the second porous surface 192. The coating layer 242, for example, can be a thermal barrier coating. A plurality of film holes 244 can be disposed in the coating layer 242 for providing a film of cooling fluid from the second porous layer 192 along the exterior of the coating layer 242.

Figure 12:
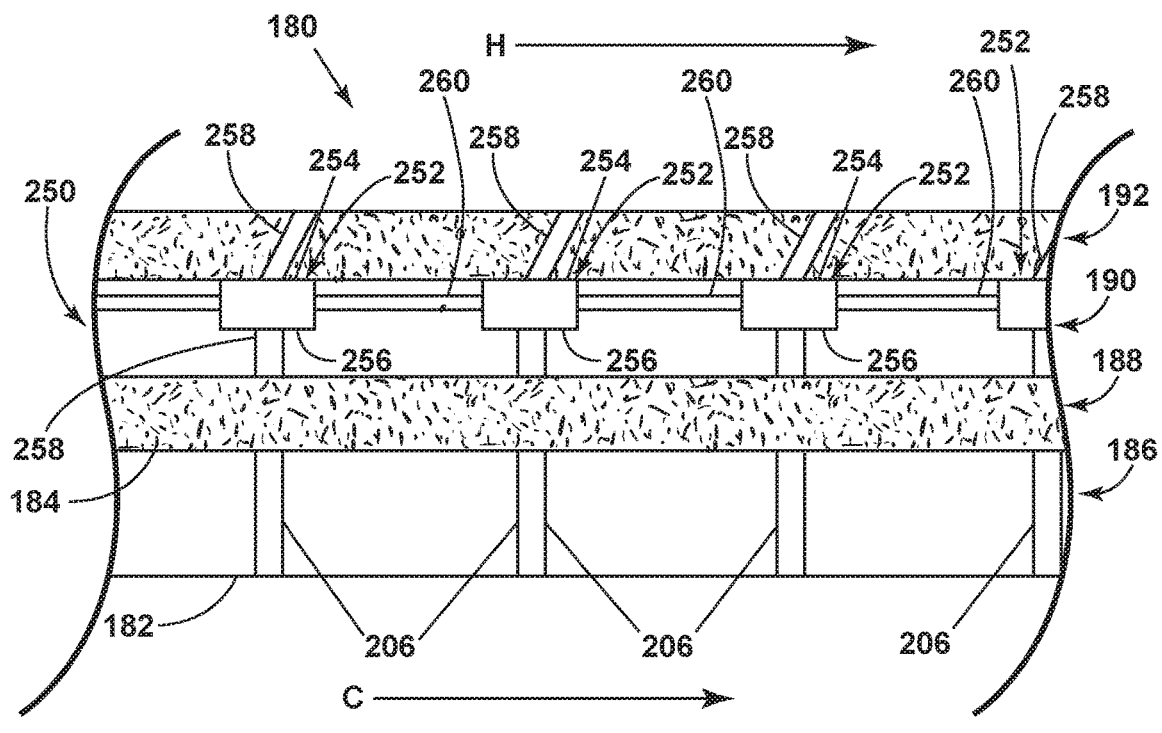
FIG. 12 is a cross-sectional view of the wall of FIG. 7 including two porous layers having channels adjacent to one porous layer and interconnected, according to an embodiment of the invention.

Referring now to FIG. 12, another exemplary skin cooling circuit 250 is illustrated having a channel 252 with an open end 254 and a closed end 256. The open end 254 is adjacent to the second porous layer 192 while the closed end 256 is spaced from the first porous layer 188. It is contemplated that the open end 254 can be adjacent to the first porous layer 188 and the closed end 256 is spaced from the second porous layer 192. One or more channel conduits 258 intersect the closed end 256 to fluidly couple the channel 252 to the first porous layer 188. Additionally, channel conduits 258 can fluidly couple adjacent channels 252. Optionally, a plurality of film holes 260 can be disposed in the second porous layer 192. The film holes 258 can provide for local increased flow rates for film cooling along the exterior of the second porous layer 192 where additional film cooling is required or local temperatures are higher.

The skin cooling circuit 250 can also include a plurality of intermediate conduits 260. The intermediate conduits 260 fluidly couple adjacent channels 252, for distributing an airflow pressure or metering the airflow provided to the second porous layer 192.

Regarding FIGS. 9-12, it should be appreciated that the film holes can originate from any side of the channels, such as any closed end as shown, the sides, or any open end as described. Furthermore, there should be no limitation on the orientation, number, size, or shape of such holes. Similarly, the supply holes also should not be limited, allowing the same range of geometry, only limited that the must originate on the inner surface. The geometry of the channels is also exemplary, and should not be limited as shown. Furthermore, the interface of the channels with the porous layer need not be of full extent as shown. For example, the junction between the channels and the porous layer can be based upon a shape of the channels, such as a polygon or oval shape having only a bottom section fluidly coupled to the porous layer.

Furthermore, it should be appreciated that the elements as shown in FIGS. 9-12 are not limited to the 2-dimensional sections as illustrated. The elements, such as the channels, film holes, or supply holes can extending in three-dimensional space, such as in a span-wise direction, an axial direction, a radial direction, or any combination or permutation thereof.

A method of cooling an airfoil 90 can include passing a cooling airflow through an interior of a porous layer 126, 188 on an outer wall 118, 180 of the airfoil 90, then passing the cooling airflow to the channel 142, 200 in a skin layer 128, 190 overlying the porous layer 126, 188, and then passing the cooling airflow to a hole 148, 244 in a coating 164, 242 in the outer surface of the skin layer 128, 190. Passing the cooling air from the channel 142, 200 to the holes 148, 244 can include multiple holes 148, 244. Additionally, the method can further include passing the air from the channel 142, 200 or hole 148, 244 through a second porous layer 192 in the skin layer 128, 190. Such a method can be implemented as shown in FIGS. 5 and 10, utilizing any of the outer wall structures described herein.

It is contemplated that the multiple-layer outer walls and cooling circuit structures described herein can be made with additive manufacturing. Additive manufacturing, such as 3D printing, can be used to form complex cooling circuit designs, having such shaping or metering sections, which is otherwise difficult to achieve with other manufacturing methods like drilling or casting. Additionally, the porous layers can be formed with additive manufacturing. Typical methods for forming porous metals can result in uneven porosity among adjacent local areas of the porous metals. Utilizing additive manufacturing can enable a manufacturer to achieve a more uniform porosity, or a more desirable distribution of porosity, along the entire porous structure. Furthermore, such manufacturing can provide a more precisely made product, having a higher yield as compared to other manufacturing strategies.

It should be appreciated that the serial cooling air flow path, utilizing at least one porous layer and a skin layer bonded to or built over the porous layer provides for deterministic, and better controlled, cooling distribution for a flow of cooling fluid. An additive manufacturing build of the regions could provide a precise distribution, particularly permitting a deterministic porosity for the porous layer(s). Additionally, the use of additive manufacturing can permit particular shaping or tailoring of the serial cooling air flow path to control the flows being provided through the path. Such shaping can include exit shaping to particularly direct or spread the cooling fluid. Utilizing such a porous material permits the flow of a fluid through the engine component, while retaining less heat to remain cooler. As such, the cooling, such as surface film cooling, provided through the walls of such engine components is enhanced. The enhanced cooling reduces the required flow of cooling fluid, such as by 30-50%. Such a reduction can increase engine efficiency. Furthermore, the reduced blowing ratios can obtain better surface film cooling to increase component lifetime or reduce required maintenance.

It should be appreciated that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
an outer wall having an outer surface and an inner surface bounding an interior, the outer wall defining a pressure side and a suction side extending axially between a leading edge and a trailing edge and extending radially between a root and a tip;
a first porous layer provided on the outer surface;
a skin layer provided on an exterior of the first porous layer with at least one channel formed in the skin layer and spaced from the first porous layer, with at least one channel conduit fluidly coupling the first porous layer to the at least one channel;
at least one cooling air supply circuit located within the interior;
a second porous layer provided on the skin layer, opposite the first porous layer;
an exterior coating provided on the second porous layer, opposite the skin layer; and
at least one film hole provided in the exterior coating, fluidly coupling the at least one channel to an exterior of the airfoil through the second porous layer and the exterior coating, and configured to provide a cooling film along the skin layer;
wherein the at least one cooling air supply circuit is fluidly coupled to the at least one porous layer, which is fluidly coupled to the at least one channel via the at least one channel conduit to define a serial cooling air flow path via the at least one cooling air supply circuit, the first porous layer and the second porous layer, and the skin layer.

2. The airfoil of claim 1 further comprising at least one hole in the outer wall fluidly coupling the at least one cooling air supply circuit to the first porous layer.

3. The airfoil of claim 1 wherein the at least one channel is fluidly coupled to both the first porous layer and the second porous layer.

4. The airfoil of claim 3 wherein the at least one channel has an open top fluidly coupled to the second porous layer and an open bottom fluidly coupled to the first porous layer.

5. The airfoil of claim 4 further comprising at least one hole in the outer wall fluidly coupling the at least one cooling air supply circuit to the first porous layer.

6. An engine component for a turbine engine, which generates a hot fluid flow, and provides a cooling fluid flow, comprising:
a wall bounding an interior and separating the hot fluid flow from the cooling fluid flow and having a first surface facing the hot fluid flow in a hot flow path and a second surface facing the cooling fluid flow;
at least one porous layer provided exterior of the first surface;
a skin layer provided on an exterior of the at least one porous layer;
a skin cooling circuit formed in the skin layer including a cooling channel, spaced from the at least one porous layer and having at least one channel conduit fluidly coupling the cooling channel to the at least one porous layer; and
an exterior coating provided exterior of the at least one porous layer, and including a film hole extending through the exterior coating fluidly coupling the skin cooling circuit to an exterior of the engine component;
wherein the cooling fluid flow is fluidly coupled from the interior to the skin layer through the at least one porous layer, wherein the at least one porous layer comprises first and second porous layers, with the first porous layer provided on the first surface and the second porous layer provided on an outer surface of the skin layer.

7. The engine component of claim 6 further comprising at least one hole in the wall fluidly coupling the interior to the at least one porous layer.

8. The engine component of claim 6 wherein the at least one channel is fluidly coupled to both the first porous layer and the second porous layer.

9. The engine component of claim 8 wherein the at least one channel has an open top fluidly coupled to the second porous layer and an open bottom fluidly coupled to the first porous layer.

10. The engine component of claim 8 further comprising at least one hole in the wall fluidly coupling the interior to the first porous layer.

11. A method of cooling an engine component comprising:

passing a cooling airflow from an interior of the engine component to a first porous layer on an exterior of an outer wall of the engine component defining the interior;

passing the cooling airflow to a channel in a skin layer overlying the first porous layer with the channel spaced from the first porous layer by a first channel conduit;

passing the cooling airflow from the channel through a second channel conduit in the skin layer to a second porous layer on an exterior of the skin layer, such that the channel in the skin layer is spaced from the second porous layer; and passing the cooling airflow through a film hole in an exterior coating, the film hole connecting the channel to an exterior of the engine component.

12. The method of claim 11 wherein passing the cooling airflow through the film hole comprises passing the cooling airflow from the channel to multiple film holes.

\* \* \* \* \*